US012072528B2

(12) United States Patent
Sakamoto et al.

(10) Patent No.: US 12,072,528 B2
(45) Date of Patent: Aug. 27, 2024

(54) OPTICAL MULTIPLEXING CIRCUIT

(71) Applicant: Nippon Telegraph and Telephone Corporation, Tokyo (JP)

(72) Inventors: Junji Sakamoto, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 301 days.

(21) Appl. No.: 17/624,441

(22) PCT Filed: Jul. 9, 2019

(86) PCT No.: PCT/JP2019/027189
§ 371 (c)(1),
(2) Date: Jan. 3, 2022

(87) PCT Pub. No.: WO2021/005723
PCT Pub. Date: Jan. 14, 2021

(65) Prior Publication Data
US 2022/0373737 A1  Nov. 24, 2022

(51) Int. Cl.
*G02B 6/12* (2006.01)
*G02B 6/125* (2006.01)
*G02F 1/21* (2006.01)

(52) U.S. Cl.
CPC ............ *G02B 6/125* (2013.01); *G02F 1/212* (2021.01); *G02B 2006/12159* (2013.01)

(58) Field of Classification Search
CPC .......... G02B 6/125; G02B 2006/12159; G02F 1/212
See application file for complete search history.

(56) References Cited

U.S. PATENT DOCUMENTS 5,357,122 A * 10/1994 Okubora ................ H01L 23/48
257/E27.128
5,393,371 A *  2/1995 Chang ................ H01S 3/06704
216/33
(Continued)

FOREIGN PATENT DOCUMENTS

CN      101278218 A  * 10/2008  ............. G02B 6/125
EP      1396741 A1   *  3/2004  ............. G02B 6/122
(Continued)

OTHER PUBLICATIONS

Akira Nakao et al., *Integrated Waveguide-Type Red-Green-Blue Beam Combiners for Compact Projection-Type Displays*, Optics Communications, vol. 330, 2014, pp. 45-48.
(Continued)

*Primary Examiner* — Peter Radkowski
(74) *Attorney, Agent, or Firm* — Workman Nydegger

(57) ABSTRACT

An optical beam combiner circuit includes a plurality of branch portions configured to divide optical beams output from a plurality of input waveguides, a combiner unit configured to combine optical beams, each of the optical beams being one of the divided optical beams obtained by one of the plurality of branch portions, an output waveguide configured to output an optical beam obtained by the combiner unit combining the optical beams, a plurality of monitoring waveguides configured to output optical beams, each of the optical beams being another of the divided optical beams obtained by one of the plurality of branch portions, and a plurality of light-blocking grooves provided on both sides with respect to each input waveguide, the plurality of light-blocking grooves being positioned to enable stray light not coupled to the plurality of input waveguides to be reflected toward an end surface different from an exit end surface of each monitoring waveguide and
(Continued)

also different from an exit end surface of the output waveguide.

10 Claims, 8 Drawing Sheets

(56) References Cited

U.S. PATENT DOCUMENTS

| | | | | |
|---|---|---|---|---|
| 6,052,222 | A * | 4/2000 | Kitamura | H01S 5/50 359/344 |
| 6,298,178 | B1 * | 10/2001 | Day | G02B 6/125 385/129 |
| 6,418,246 | B1 * | 7/2002 | Gampp | G02B 6/122 385/11 |
| 6,438,280 | B1 * | 8/2002 | Gampp | G02F 1/035 385/44 |
| 6,480,639 | B2 * | 11/2002 | Hashimoto | G02B 6/4246 372/50.1 |
| 6,789,959 | B1 * | 9/2004 | Conn | G02B 6/4214 385/94 |
| 6,807,326 | B2 * | 10/2004 | Han | G02B 6/12004 385/94 |
| 6,856,735 | B2 * | 2/2005 | Chang | G02B 6/2852 385/48 |
| 6,947,671 | B2 * | 9/2005 | Sekiya | G02B 6/4214 359/489.14 |
| 7,095,913 | B2 * | 8/2006 | Bloom | G02B 6/3596 385/24 |
| 7,181,098 | B2 * | 2/2007 | Kwon | G02B 6/4246 385/129 |
| 7,310,453 | B2 * | 12/2007 | Ichikawa | G02F 1/225 385/2 |
| 7,373,044 | B2 * | 5/2008 | Sekiya | G02B 6/4214 359/837 |
| 7,489,840 | B2 * | 2/2009 | Sekiya | G02B 6/4209 359/489.08 |
| 7,526,161 | B2 * | 4/2009 | Ishii | G02B 6/29385 385/48 |
| 7,792,399 | B2 * | 9/2010 | Kato | G02B 6/3514 385/18 |
| 7,903,911 | B2 * | 3/2011 | Sekiya | G02B 6/4209 385/36 |
| 8,288,157 | B2 * | 10/2012 | Duer | G01N 21/7703 436/805 |
| 8,483,525 | B2 * | 7/2013 | Kitoh | G02B 6/12019 385/14 |
| 8,625,943 | B2 * | 1/2014 | Soma | G02B 6/12019 385/38 |
| 8,675,199 | B2 * | 3/2014 | Duer | G02B 6/4226 385/12 |
| 8,704,447 | B2 * | 4/2014 | Ide | G02B 6/12007 359/326 |
| 8,747,751 | B2 * | 6/2014 | Duer | G01N 21/6452 385/12 |
| 8,750,712 | B2 * | 6/2014 | Ruiz | G02B 6/42 398/135 |
| 8,861,970 | B2 * | 10/2014 | Paslaski | G02B 6/4246 398/115 |
| 8,867,873 | B2 * | 10/2014 | Kamei | G02B 6/12026 385/24 |
| 9,020,307 | B2 * | 4/2015 | Ishikawa | G02B 6/243 385/38 |
| 9,081,214 | B2 * | 7/2015 | Oikawa | G02F 1/225 |
| 9,178,622 | B2 * | 11/2015 | Ruiz | G02B 6/4283 |
| 9,240,671 | B2 * | 1/2016 | Ide | H01S 5/02325 |
| 9,423,397 | B2 * | 8/2016 | Duer | C12Q 1/6825 |
| 9,528,939 | B2 * | 12/2016 | Duer | G01N 21/6452 |
| 9,588,395 | B2 * | 3/2017 | Jewart | G02F 1/2257 |
| 9,612,410 | B2 * | 4/2017 | Oguro | G02B 6/4246 |
| 9,684,129 | B2 * | 6/2017 | Ishikawa | G02B 6/12 |
| 9,857,534 | B2 * | 1/2018 | Kusaka | G02B 6/14 |
| 10,126,502 | B2 * | 11/2018 | Ishikawa | G02B 6/2552 |
| 10,355,448 | B2 * | 7/2019 | Sugiyama | H01S 5/101 |
| 10,408,999 | B2 * | 9/2019 | Katsuyama | G02B 6/124 |
| 10,551,318 | B2 * | 2/2020 | Duer | G01N 21/7703 |
| 11,287,571 | B2 * | 3/2022 | Katsuyama | G03B 21/2066 |
| 2002/0001427 | A1 * | 1/2002 | Hashimoto | G02B 6/4246 385/14 |
| 2003/0086651 | A1 * | 5/2003 | Chang | G02B 6/12004 385/48 |
| 2004/0197044 | A1 * | 10/2004 | Bloom | G02B 6/3596 385/16 |
| 2004/0258354 | A1 * | 12/2004 | Sekiya | G02B 6/4292 385/35 |
| 2005/0008314 | A1 * | 1/2005 | Drake | G02B 6/136 216/2 |
| 2005/0105842 | A1 * | 5/2005 | Vonsovici | G02B 6/122 385/14 |
| 2005/0284180 | A1 * | 12/2005 | Sekiya | G02B 6/4214 65/66 |
| 2006/0002713 | A1 * | 1/2006 | Sekiya | G02B 6/4214 398/141 |
| 2006/0110089 | A1 * | 5/2006 | Ichikawa | G02F 1/225 385/14 |
| 2008/0019632 | A1 * | 1/2008 | Ishii | G02F 1/225 385/2 |
| 2008/0049804 | A1 * | 2/2008 | Hashimoto | H01S 5/227 257/E33.049 |
| 2009/0068668 | A1 * | 3/2009 | Duer | G01N 33/54373 436/86 |
| 2009/0148099 | A1 * | 6/2009 | Sekiya | G02B 6/4209 385/33 |
| 2009/0185776 | A1 * | 7/2009 | Kato | G02B 6/3514 385/16 |
| 2009/0312188 | A1 * | 12/2009 | Duer | B01L 3/502715 506/38 |
| 2010/0302544 | A1 * | 12/2010 | Duer | G02B 6/4226 385/27 |
| 2010/0303412 | A1 * | 12/2010 | Okuno | G02B 6/4206 385/39 |
| 2011/0064355 | A1 * | 3/2011 | Soma | G02B 6/12019 385/38 |
| 2011/0110624 | A1 * | 5/2011 | Kamei | G02B 6/12016 385/24 |
| 2011/0268447 | A1 * | 11/2011 | Kitoh | G02B 6/12016 385/24 |
| 2011/0268450 | A1 * | 11/2011 | Paslaski | H04B 10/43 398/115 |
| 2012/0057880 | A1 * | 3/2012 | Ruiz | H04B 10/501 398/136 |
| 2012/0068609 | A1 * | 3/2012 | Ide | G02B 6/12004 315/152 |
| 2012/0251041 | A1 * | 10/2012 | Ishikawa | G02B 6/30 385/24 |
| 2013/0071850 | A1 * | 3/2013 | Duer | G01N 21/0332 435/7.1 |
| 2013/0215425 | A9 * | 8/2013 | Duer | G02B 6/4226 385/27 |
| 2013/0251301 | A1 * | 9/2013 | Oikawa | G02F 1/225 385/2 |
| 2014/0178861 | A1 * | 6/2014 | Duer | G01N 33/54373 435/7.1 |
| 2014/0293402 | A1 * | 10/2014 | Ide | H01S 5/4093 359/326 |
| 2014/0328600 | A1 * | 11/2014 | Ruiz | G02B 6/4246 398/136 |
| 2015/0205043 | A1 * | 7/2015 | Ishikawa | G02B 6/243 385/38 |
| 2015/0241633 | A1 * | 8/2015 | Kusaka | G02F 1/2255 385/24 |
| 2016/0170156 | A1 * | 6/2016 | Oguro | G02B 6/4206 385/14 |
| 2016/0357085 | A1 * | 12/2016 | Jewart | G02B 6/122 |
| 2017/0067829 | A1 * | 3/2017 | Duer | G01N 21/6452 |
| 2017/0146742 | A1 * | 5/2017 | Ishikawa | G02B 6/1228 |
| 2017/0353008 | A1 * | 12/2017 | Sugiyama | H01S 5/142 |
| 2019/0107675 | A1 * | 4/2019 | Katsuyama | G02B 6/124 |

(56) References Cited

U.S. PATENT DOCUMENTS

| | | | | |
|---|---|---|---|---|
| 2019/0339451 A1* | 11/2019 | Katsuyama | ..........  | H04N 9/3161 |
| 2020/0348467 A1* | 11/2020 | Katsuyama | .............. | G02B 6/12 |
| 2021/0286127 A1* | 9/2021 | Katsuyama | ........ | G03B 21/2066 |

FOREIGN PATENT DOCUMENTS

| | | | | | |
|---|---|---|---|---|---|
| EP | 2378329 | A1 | * | 10/2011 | ......... G02B 6/12016 |
| GB | 2461026 | A | * | 12/2009 | ........ B01L 3/502715 |
| JP | H11248954 | A | * | 9/1999 | |
| JP | 2000075155 | A | * | 3/2000 | |
| JP | 2004157192 | A | * | 6/2004 | |
| JP | 2018-180513 | A | | 11/2018 | |
| JP | 2019095485 | A | * | 6/2019 | |
| WO | WO-2004034530 | A1 | * | 4/2004 | ......... G02B 6/12019 |
| WO | 2019/111401 | A1 | | 6/2019 | |

OTHER PUBLICATIONS

Yoshinori Hibino et al., *An Array of Photonic Filtering Advantages: Arrayed-Waveguide-Grating Multi/Demultiplexers for Photonic Networks*, IEEE Circuits & Devices, Nov. 2000, pp. 21-27.

Akira Himeno et al., *Silica-Based Planar Lightwave Circuits*, IEEE Journal of Selected Topics in Quantum Electronics, vol. 4, No. 6, 1998, pp. 913-924.

J. Sakamoto, et al., *High-Efficiency Multiple-Light-Source Red-Green-Blue Power Combiner with Optical Waveguide Mode Coupling Technique*, SPIE OPTO, 2017, Jan. 28, 2017, pp. 1-8.

\* cited by examiner

OPTICAL MULTIPLEXING CIRCUIT

TECHNICAL FIELD

The present invention relates to optical beam combiner circuits. In particular, the present invention relates to an optical beam combiner circuit capable of combining optical beams of a plurality of kinds of wavelengths, such as optical beams of the three primary colors, and capable of monitoring the intensity of the optical beams of the different wavelengths.

BACKGROUND ART

In recent years, as a light source applied to a glasses device or a small pico projector, a small light source including laser diodes (LD) for outputting lights of the three primary colors, specifically R (red light), G (green light), and B (blue light), has been developed. Since LDs can achieve a higher straightness as compared to LEDs, LDs can form a focus-free projector. LDs can also achieve high light-emission efficiency, low power consumption, and high color reproduction capabilities, and thus, LDs have attracted attention in recent years.

FIG. 1 illustrates a typical light source of a projector using LDs. The projector light source includes LDs 1 to 3 configured to respectively output single-wavelength lights of the respective colors R, G, and B, lenses 4 to 6 configured to collimate the lights output by the LDs 1 to 3, and dichroic mirrors 10 to 12 configured to combine the lights into an optical beam and output the optical beam to a micro-electro-mechanical system (MEMS) mirror 16. The RGB lights combined into the single beam is swept by the MEMS mirror 16 and synchronized with the modulation of the LDs, and as a result, images are projected on a screen 17. Half mirrors 7 to 9 are inserted between the lenses 4 to 6 and the dichroic mirrors 10 to 12 and configured to divide the respective lights of the different colors. The branch lights are monitored by photodiodes (PDs) 13 to 15 to control white balance.

The LD typically emits light forwards and backwards with respect to a resonator. However, the monitoring precision is worse at the back than the front, and thus, light is usually monitored on the front side in the forward direction in which the light is emitted (front monitoring). As illustrated in FIG. 1, to implement an RGB light source, bulk optical components such as the LDs 1 to 3, the lenses 4 to 6, the half mirrors 7 to 9, and the dichroic mirrors 10 to 12 need to be integrated together as a free-space optical system. In addition, bulk components such as the half mirrors 7 to 9 and the PDs 13 to 15 are necessary for monitoring for the purpose of white balance adjustment, and thus, the optical system increases in size, which hinders downsizing of the light source.

Alternatively, an RGB coupler using a silica-based planar lightwave circuit (PLC) instead of the free-space optical system composed of bulk components is attracting attention (refer to, for example, Non-Patent Literature 1). The PLC is formed by combining optical waveguides, which are patterned by photolithography or the like and etched by reactive-ion etching on a planar substrate made of Si or the like, with a plurality of basic optical circuits (for example, a directional coupler and a Mach-Zehnder interferometer), such that various functions can be implemented (refer to, for example, Non-Patent Literature 2 and 3).

FIG. 2 illustrates a basic structure of an RGB coupler using a PLC. FIG. 2 illustrates an RGB coupler module including LDs 21 to 23 of the respective colors G, B, and R and an RGB coupler 20 formed as an PLC. The RGB coupler 20 includes first to third waveguides 31 to 33 and first and second combiners 34 and 35 for combining optical beams from two waveguides into one waveguide. The combiner used in the RGB coupler module is implemented by using, for example, symmetry directional couplers consisting of waveguides of an identical width, a Mach-Zehnder interferometer (refer to, for example, Non-Patent Literature 1), or a mode coupler (refer to, for example, Non-Patent Literature 4).

Using the PLC enables the free-space optical system formed by using lenses, dichroic mirrors, and the like to be integrated into a single chip. Since the LDs of R and G output light weaker than light from the LD of B, an RRGGB light source including two LDs of R and two LDs of G is used. As described in Non-Patent Literature 2, mode multiplexing enables identical-wavelength optical beams in different modes to be combined together, and thus, by using the PLC, an RRGGB coupler can be easily implemented.

CITATION LIST

Non-Patent Literature

Non-Patent Literature 1: A. Nakao, R. Morimoto, Y. Kato, Y. Kakinoki, K. Ogawa and T. Katsuyama, "Integrated waveguide-type red-green-blue beam combiners for compact projection-type displays", Optics Communications 3 20 (2014) 45-48

Non-Patent Literature 2: Y. Hibino, "Arrayed-Waveguide-Grating Multi/Demultiplexers for Photonic Networks," IEEE CIRCUITS & DEVICES, November, 2000, pp. 21-27

Non-Patent Literature 3: A. Himeno, et al., "Silica-Based Planar Lightwave Circuits," J. Sel. Top. Q.E., vol. 4, 1998, pp. 913-924

Non-Patent Literature 4: J. Sakamoto et al. "High-efficiency multiple-light-source red-green-blue power combiner with optical waveguide mode coupling technique," Proc. of SPIE Vol. 10126 101260M-2

SUMMARY OF THE INVENTION

Technical Problem

FIG. 3 illustrates a configuration of an RGB coupler using two directional couplers. An RGB coupler 100 using a PLC includes first to third input waveguides 101 to 103, first and second directional couplers 104 and 105, and an output waveguide 106 connected to the second input waveguide 102.

The waveguide length, waveguide width, and gap between waveguides of the first directional coupler 104 are designed to couple an optical beam of $\lambda 2$ entering from the first input waveguide 101 to the second input waveguide 102 and also couple an optical beam of $\lambda 1$ entering from the second input waveguide 102 to the first input waveguide 101 and back to the second input waveguide 102. The waveguide length, waveguide width, and gap between waveguides of the second directional coupler 105 are designed to couple an optical beam of $\lambda 3$ entering from the third input waveguide 103 to the second input waveguide 102 and also transmit the optical beam of $\lambda 1$ and optical beam of $\lambda 2$ coupled to the second input waveguide 102 by the first directional coupler 104.

For example, green light G (wavelength of $\lambda 2$) enters the first input waveguide 101, blue light B (wavelength of $\lambda 1$) enters the second input waveguide 102, and red light R (wavelength of λ3) enters the third input waveguide 103; the light beams of the three colors R, G, and B are combined together by the first and second directional couplers 104 and 105 and output through the output waveguide 106. The wavelengths of λ1, λ2, and λ3 are 450 nm, 520 nm, and 638 nm.

However, constructing a light source having a monitoring function for adjusting white balance by using such an RGB coupler has not been examined because there are concerns about downsizing of light source and monitoring precision.

Means for Solving the Problem

An object of the present invention is to provide an optical beam combiner circuit including a combiner unit implemented as a planar lightwave circuit (PLC) and capable of precisely monitoring optical beams of a plurality of kinds of wavelengths.

To achieve this object, in the present invention, an optical beam combiner circuit according to one aspect includes a plurality of branch portions configured to divide optical beams output from a plurality of input waveguides, a combiner unit configured to combine optical beams, each of the optical beams being one of the divided optical beams obtained by one of the plurality of branch portions, an output waveguide configured to output an optical beam obtained by the combiner unit combining the optical beams, a plurality of monitoring waveguides configured to output optical beams, each of the optical beams being another of the divided optical beams obtained by one of the plurality of branch portions, and a plurality of light-blocking grooves provided on both sides with respect to each input waveguide, each of the plurality of light-blocking grooves being spaced apart by a predetermined interval from a corresponding one of the plurality of input waveguides, the plurality of light-blocking grooves being positioned to enable stray light not coupled to the plurality of input waveguides to be reflected toward an end surface different from an exit end surface of each monitoring waveguide and also different from an exit end surface of the output waveguide.

A plurality of light-blocking grooves may be also provided on sides with respect to each of the plurality of monitoring waveguides, the output waveguide, and the combiner unit. The plurality of light-blocking grooves may be tilted by an angle of 45 degrees to the optical axes of the input waveguides.

Effects of the Invention

In the present invention, light-blocking grooves are positioned to prevent stray light from entering the PD coupled to the monitoring waveguide and a port coupled to the output waveguide, and as a result, precise monitoring can be achieved.

DESCRIPTION OF EMBODIMENTS

Hereinafter, embodiments of the present invention will be described in detail with reference to the drawings. The embodiments describe a method in which a directional coupler is used as a combiner, but this combination method does not limit the present invention. Additionally, the description is made by using an RGB coupler configured to combine optical beams of different wavelengths of the three primary colors as an example, but, needless to say, the embodiments can be applied to optical beam combiner circuits configured to combine optical beams of other kinds of wavelengths.

First Embodiment

Figure 4:
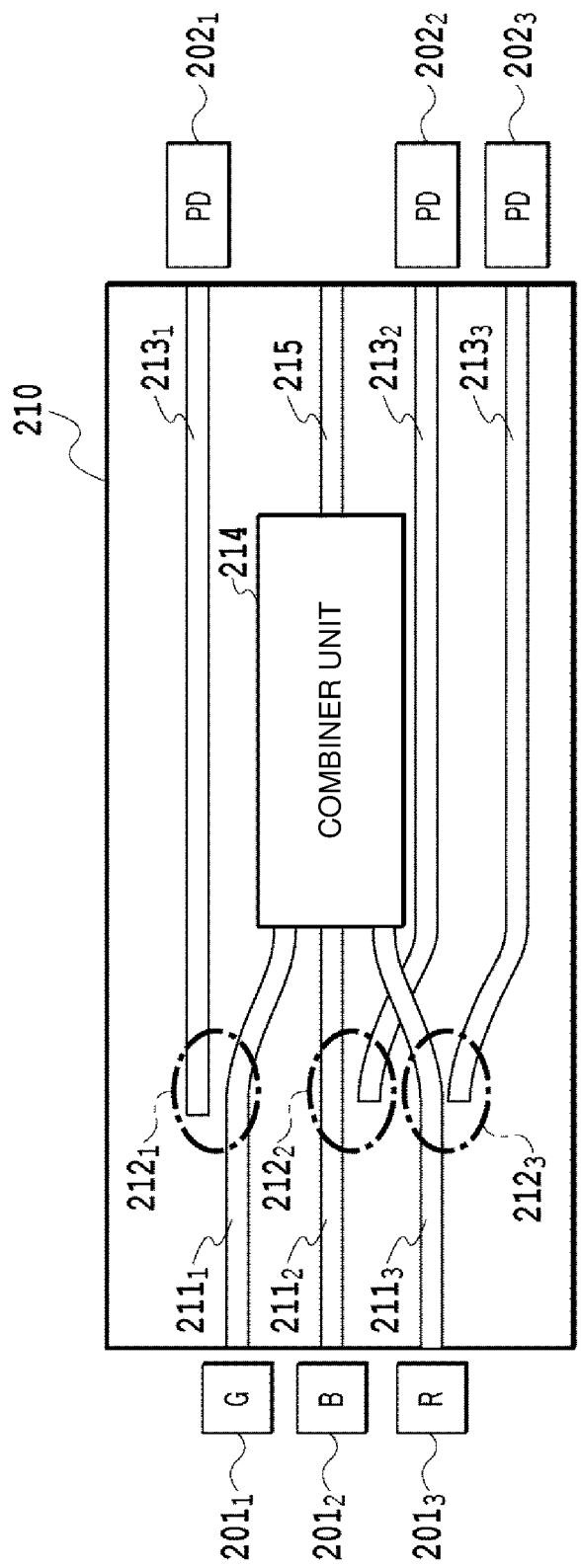
FIG. 4 illustrates a light source having a monitoring function according to a first embodiment of the present invention.

FIG. 4 illustrates a light source having a monitoring function according to a first practical example of a first embodiment of the present invention. The light source having a monitoring function includes first to third laser diodes (LDs) $201_1$ to $201_3$ configured to output optical beams of the respective colors R (red light), G (green light), and B (blue light), and a planar lightwave circuit (PLC)-type RGB coupler 210, and first to third photodiodes (PDs) $202_1$ to $202_3$ optically connected to the RGB coupler 210.

The PLC-type RGB coupler 210 includes first to third input waveguides $211_1$ to $211_3$, first to third branch portions $212_1$ to $212_3$, a combiner unit 214, first to third monitoring waveguides $213_1$ to $213_3$, and an output waveguide 215. The first to third input waveguides $211_1$ to $211_3$ are optically connected to the first to third LDs $201_1$ to $201_3$. The first to third branch portions $212_1$ to $212_3$ divide an optical beam propagating along a corresponding waveguide into two. The combiner unit 214 combines optical beams that are one of the divided optical beams divided by each of the first to third branch portions $212_1$ to $212_3$. The first to third monitoring waveguides $213_1$ to $213_3$ output the other of the optical beams divided by the respective first to third branch portions $212_1$ to $212_3$ to the first to third PDs $202_1$ to $202_3$. The output waveguide 215 outputs a combined optical beam obtained by the combiner unit 214.

In the PLC-type RGB coupler 210, optical beams enter the first to third input waveguides $211_1$ to $211_3$, and the first to third branch portions $212_1$ to $212_3$ divides the respective optical beams into two. One of the divided optical beams is output to a corresponding one of the first to third PDs $202_1$ to $202_3$ through a corresponding one of the first to third monitoring waveguides $213_1$ to $213_3$. The others of the divided optical beams are combined together by the combiner unit 214 and output to the output waveguide 215.

Figure 1:
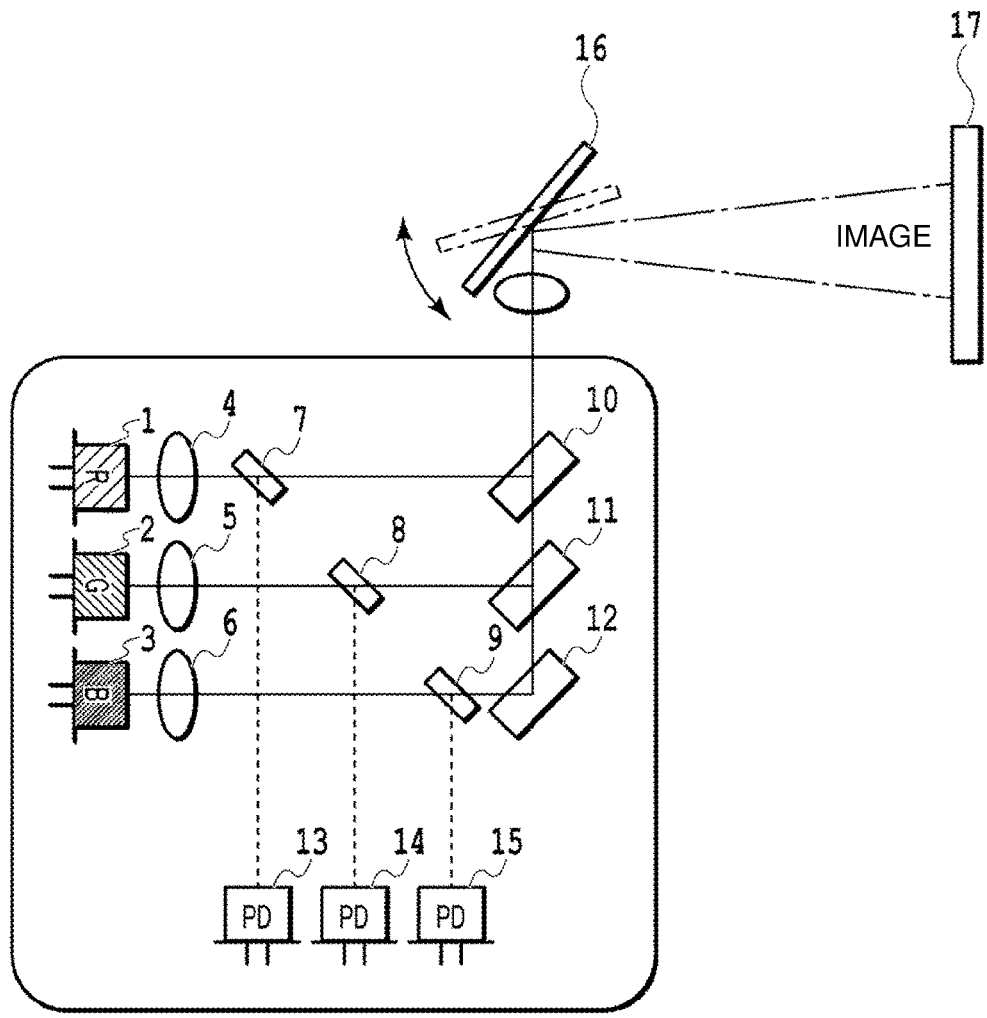
FIG. 1 illustrates a typical light source of a projector using laser diodes (LDs).
Figure 2:
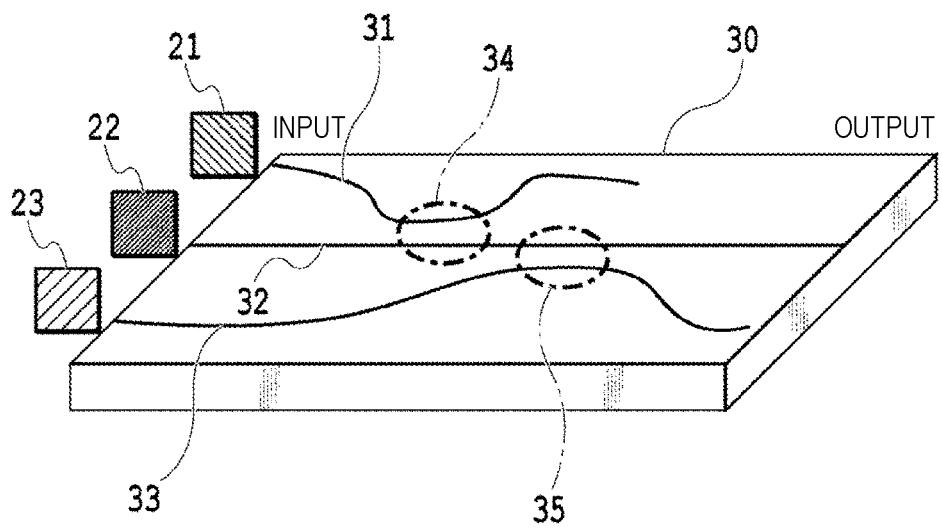
FIG. 2 illustrates a basic structure of an RGB coupler using a planar lightwave circuit (PLC).
Figure 3:
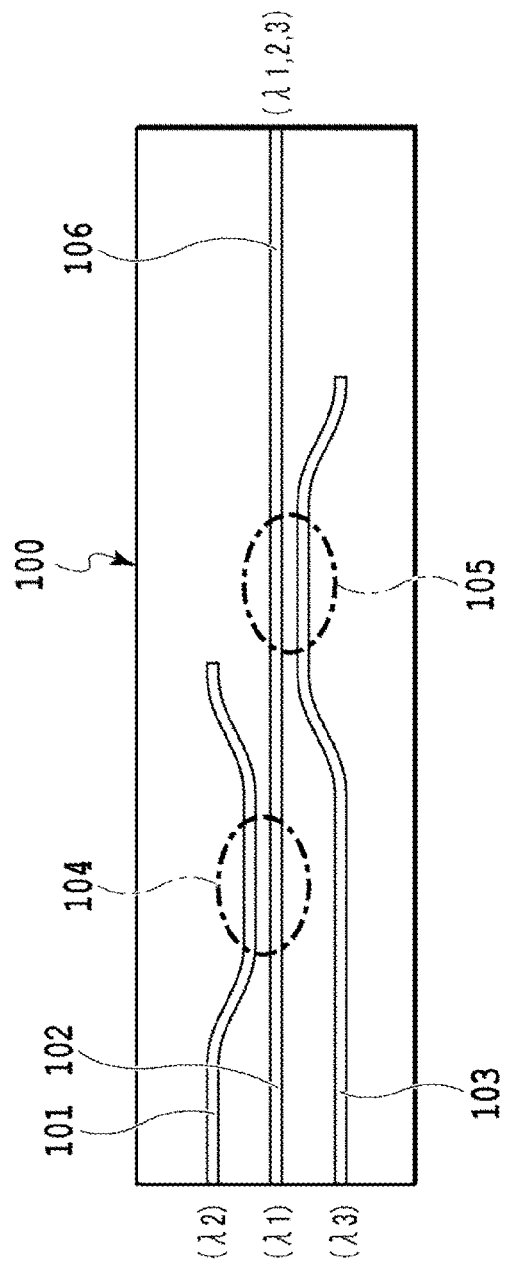
FIG. 3 illustrates a configuration of an RGB coupler using two directional couplers.

The combiner unit 214 can be implemented as an optical beam combiner circuit using the directional coupler illustrated in FIG. 3. In this case, the first to third input waveguides $211_1$ to $211_3$ are respectively coupled to the first to third input waveguides 101 to 103 illustrated in FIG. 3; the output waveguide 215 is coupled to the output waveguide 106 illustrated in FIG. 3. The combiner unit 214 is not limited to this example and may be implemented by using different combiner means with waveguides (for example, a Mach-Zehnder interferometer or a mode coupler).

When optical beams propagating along the first to third input waveguides $211_1$ to $211_3$ are divided by the first to third branch portions $212_1$ to $212_3$ as illustrated in FIG. 4, it is possible to monitor the coupling characteristic between the first to third LDs $201_1$ to $201_3$ and the first to third input waveguides $211_1$ to $211_3$. In addition, by previously determining the multiplexing characteristic of the combiner unit 214, it is possible to adjust white balance of the light source in accordance with monitor values obtained by using the first to third PDs $202_1$ to $202_3$.

Second Embodiment

Figure 5:
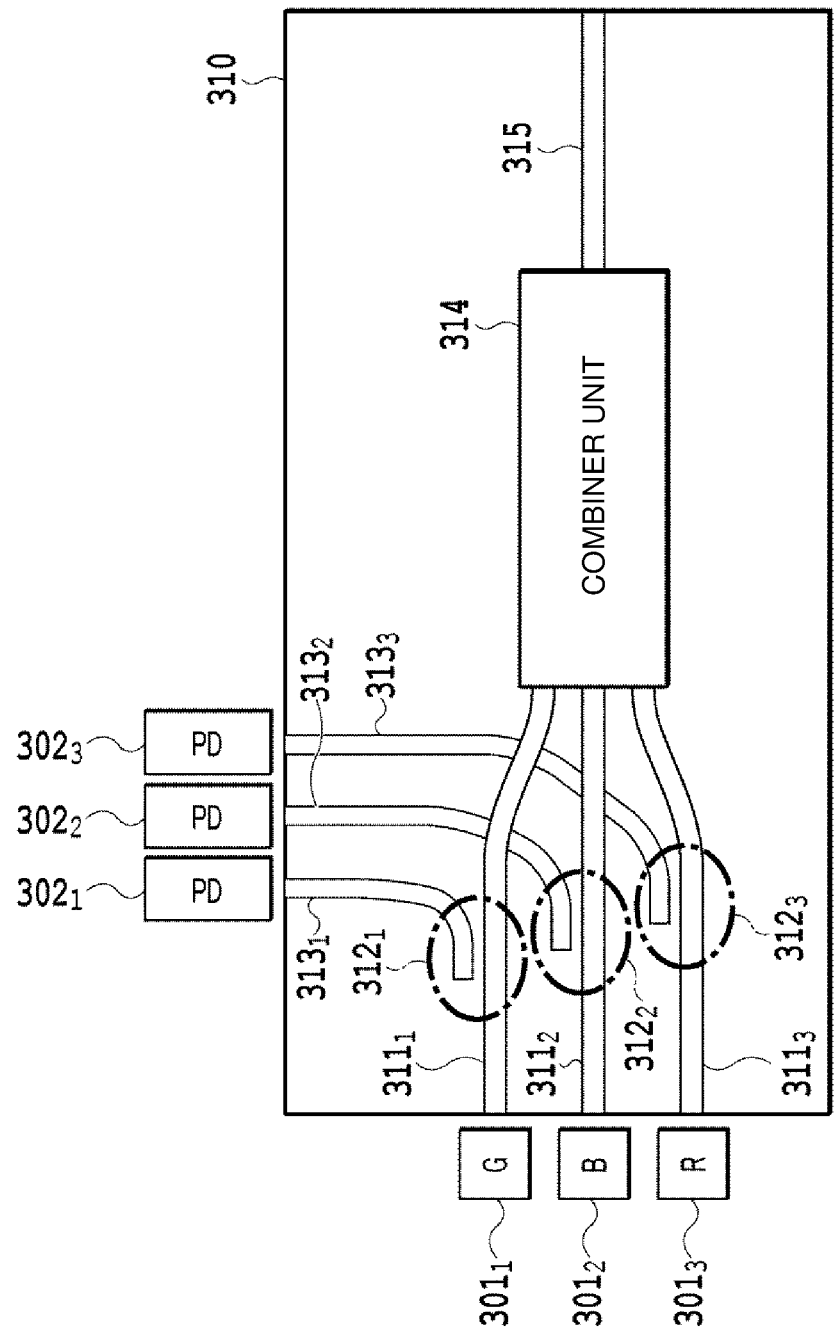
FIG. 5 illustrates a light source having a monitoring function according to a second embodiment of the present invention.

FIG. 5 illustrates a light source having a monitoring function according to a second embodiment of the present invention. Since the first embodiment can monitor optical beams of the colors R, G, and B, when, for example, the deviation from designed values of the RGB coupler differs between the shorter wavelength (B) and the longer wavelength (R) due to manufacturing errors, feedback control can be performed for the individual colors, and as a result, it is possible to precisely adjust white balance. However, when the PD 202 is positioned facing a light emitting surface of the LD 201, stray light may enter the PD 202, and as a result, accurate monitor values may be not necessarily obtained. Examples of the stray light include an optical beam leaking into the RGB coupler 210 because the output from the LD 201 cannot be coupled to the input waveguide 211, an optical beam leaking from the combiner unit 214 or having failed to be combined with other optical beams by the combiner unit 214, and an optical beam leaking into the RGB coupler 210 through a dump port of the combiner unit 214.

In consideration of this, in the second embodiment, not to position an LD 301 and a PD 302 to face each other, first to third monitoring waveguides 3131 to $313_3$ are formed as bent waveguides for changing the optical path by 90°. Since the direction in which the LD 301 emits an optical beam and the direction in which a combiner unit 314 outputs an optical beam are substantially perpendicular to the direction in which an optical beam enters the PD 302, the PD 302 can avoid incident stray light.

A PLC-type RGB coupler 310 includes first to third input waveguides $311_1$ to $311_3$ optically connected to the first to third LDs $301_1$ to $301_3$, first to third branch portions $312_1$ to $312_3$ for dividing an optical beam propagating a corresponding waveguide into two, the combiner unit 314 for combining optical beams that are one of the divided optical beams obtained by each of the first to third branch portions $312_1$ to $312_3$, first to third monitoring waveguides $313_1$ to $313_3$ for outputting the other of the optical beams divided by the respective first to third branch portions $312_1$ to $312_3$ to first to third PDs $302_1$ to $302_3$, and an output waveguide 315 for outputting a combined optical beam obtained by the combiner unit 214.

Third Embodiment

In the second embodiment, the PD 302 can avoid incident stray light. However, it is known that, at the connection surface between the LD 301 and the input waveguides 311 of the RGB coupler 310, 2 to 30% of the optical beam output by the LD is usually not coupled to the input waveguides and output as stray light. As a result, when the direction in which the LD 301 emits an optical beam is substantially perpendicular to the direction in which an optical beam enters the PD 302, the PD 302 does not completely avoid incident stray light. Furthermore, the stray light cannot be prevented from entering a port coupled to the output waveguide 315.

In consideration of this, in the third embodiment, light-blocking grooves are provided at areas without the waveguides and optical functional circuit in the RGB coupler 310 to reflect stray light, so that stray light is prevented from entering the PD 302 and the port coupled to the output waveguide 315 as much as possible.

FIRST PRACTICAL EXAMPLE

Figure 6:
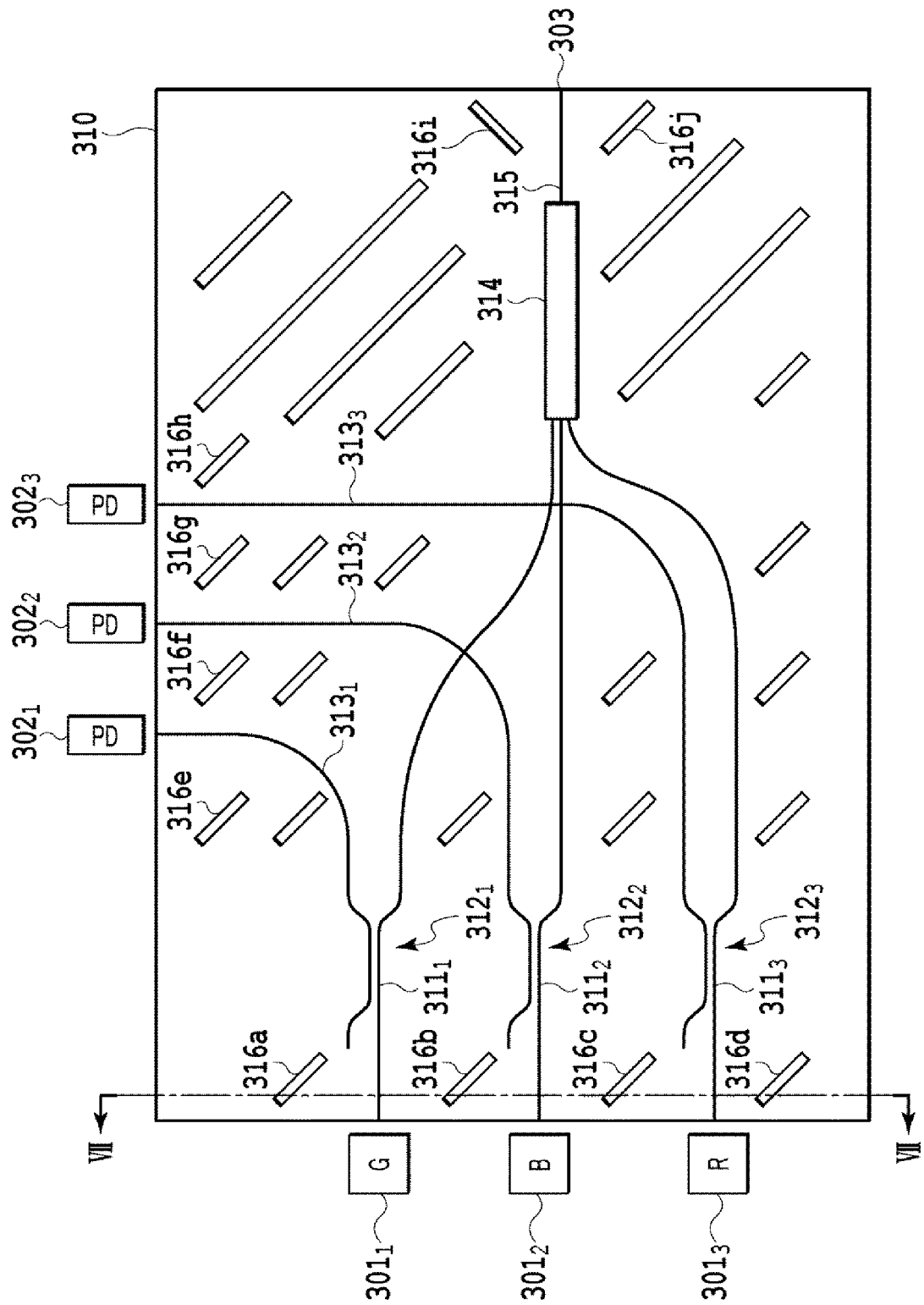
FIG. 6 illustrates a light source having a monitoring function according to a first practical example of a third embodiment of the present invention.

FIG. 6 illustrates a light source having a monitoring function according to a first practical example of the third embodiment of the present invention. The light source having a monitoring function includes the first to third LDs $301_1$ to $301_3$ configured to output optical beams of the respective colors R, G, and B, the PLC-type RGB coupler 310, and the PD $302_1$ to $302_3$ optically connected to the RGB coupler 310. The illustration of the RGB coupler 310 is modified approximately in proportion to the ratio of the size of the actual waveguides and the size of the optical functional circuit. The light-blocking grooves 316 are provided at areas not including the branch portions 312 and the combiner unit 314 of the optical functional circuit and other waveguides.

Figure 7:
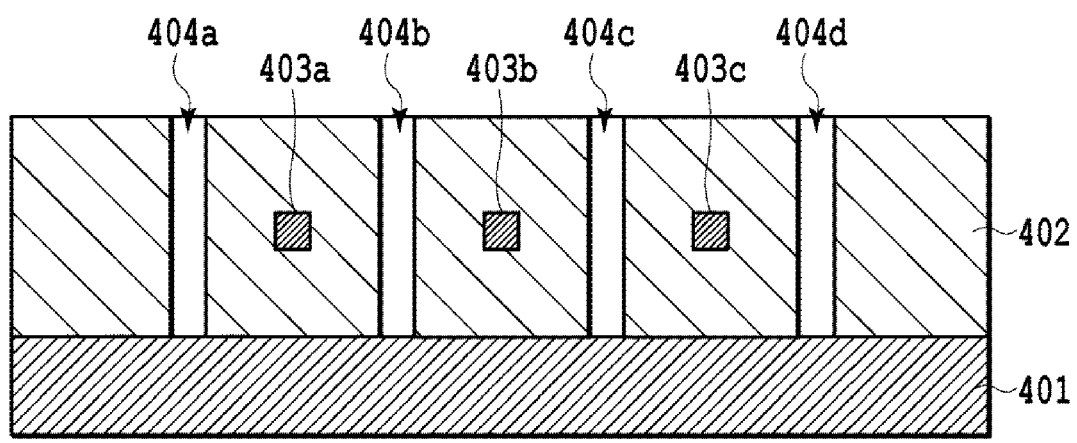
FIG. 7 illustrates a structure of light-blocking grooves of the third embodiment.

FIG. 7 illustrates a structure of the light-blocking grooves of the third embodiment. FIG. 7 is a sectional view of a part at which the input waveguides 311 of the RGB coupler 310 are formed. On a substrate 401, a lower cladding layer and a core layer are layered; and core patterns 403a to 403c are formed by etching to form desired waveguide patterns. A cladding 402 is formed by layering an upper cladding to cover the lower cladding layer and the core patterns 403, such that buried waveguides are formed. Next, light-blocking grooves 404a to 404d are formed by cutting the cladding 402 down to the substrate 401 by etching. In a typical PLC, the core is 2 μm square; the thickness of the cladding is 20 μm; the width of the light-blocking grooves 404 is 50 to 75 μm.

The side walls of the light-blocking grooves 404 function as total internal reflection surfaces capable of reflecting stray light; alternatively, the light-blocking grooves 404 may be filled with a light-blocking material. As described above, the precision of monitoring can be improved by adding the simple processing, which is etching for forming light-blocking grooves, to the known process of manufacturing a PLC-type RGB coupler.

The positioning of the light-blocking grooves 316 is described by referring back to FIG. 6. The light-blocking grooves 316 are formed at an angle of approximately 45 degrees to the direction in which the LDs 301 emit optical beams and the direction in which the combiner unit 314 outputs an optical beam. The light-blocking grooves 316 are provided to enable stray lights emitted by the LDs 301 and not coupled to the input waveguides 311 to be reflected by the light-blocking grooves 316 and output to a surface opposite to the surface coupled to the PDs 302; in other words, the light-blocking grooves 316 are positioned to reflect stray light toward an end surface different from the exit end surfaces of the monitoring waveguides 313 and also different from the exit end surface of the output waveguide 315. While the optimum angle of the light-blocking grooves 316 to the direction in which the LDs 301 emit optical beams is 45 degrees, any angle can be used when the light-blocking grooves 316 can reflect stray light in the direction in which the stray light is not coupled to the PD 302 and the output port.

In the order from the largest effect of removing stray light to the smallest effect, firstly, the light-blocking grooves 316a to 316d are provided close to the connection surfaces between the LDs 301 and the input waveguides 311 on both sides with respect to each input waveguide 311 with a predetermined interval to each input waveguide 311; the light-blocking grooves 316a to 316d are tilted by an angle of 45 degrees to the optical axes from the entrance end surfaces of the input waveguides 311. The light-blocking grooves 316a to 316d are positioned to reflect stray light from the LDs 301 toward the surfaces opposite to the exit end surfaces of the monitoring waveguides 313. Additionally, a plurality of light-blocking grooves may be provided along the optical axes from the entrance end surfaces of the input waveguides 311.

Secondly, the light-blocking grooves 316e to 316h are provided close to the connection surfaces between the PDs 302 and the monitoring waveguides 313 on both sides with respect to each monitoring waveguide 313 with a predetermined interval to each monitoring waveguides 313. The light-blocking grooves 316e to 316h are positioned to prevent stray light other than optical beams propagating along the monitoring waveguides 313 from entering the PDs 302; in other words, the light-blocking grooves 316 are positioned to reflect stray light in the direction different from the direction in which optical beams are output from the exit end surfaces of the monitoring waveguides 313. The preferable angle of the light-blocking grooves 316 is 45 degrees to the direction in which optical beams are output from the monitoring waveguides 313. A plurality of light-blocking grooves may be additionally provided between the input waveguides 311 and between the monitoring waveguides 313. No light-blocking groove should be provided along lines perpendicular to the light-receiving surfaces of the PDs 302 and along a line perpendicular to the exit end surface of the output waveguide 315.

Thirdly, the light-blocking grooves 316i and 316j are provided to prevent stray light from entering the port coupled to the output waveguide 315. The light-blocking groove 316j is positioned in the same direction as the direction of the other light-blocking grooves, for example, tilted by an angle of 45 degrees to the optical axis of the output waveguide 315; by contrast, the light-blocking groove 316i is positioned on the opposite side with respect to the output waveguide 315 and tilted by an angle of 90 degrees to the light-blocking groove 316j. This means that the light-blocking grooves 316i and 316j together form a truncated V-shape in which the output waveguide 315 is interposed between the light-blocking grooves 316i and 316j, such that the light-blocking grooves 316i and 316j reflect stray light in directions different from the direction in which the output waveguide 315 outputs an optical beam.

Additionally, to remove stray light leaking through the dump port of the combiner unit 214, a plurality of light-blocking grooves are provided around the combiner unit 314. The plurality of light-blocking grooves are tilted by an angle of 45 degrees to the optical axes of the input waveguides 311; in other words, the plurality of light-blocking grooves are parallel with the other light-blocking grooves. The light-blocking grooves may be formed with a fixed length or elongated when the light-blocking grooves do not intersect the waveguides formed in the RGB coupler 310.

With this configuration, stray light is reflected toward a surface opposite to the surface coupled to the PDs 302 and also reflected not to enter the port coupled to the output waveguide 315, and as a result, the precision of monitoring can be improved.

SECOND PRACTICAL EXAMPLE

Figure 8:
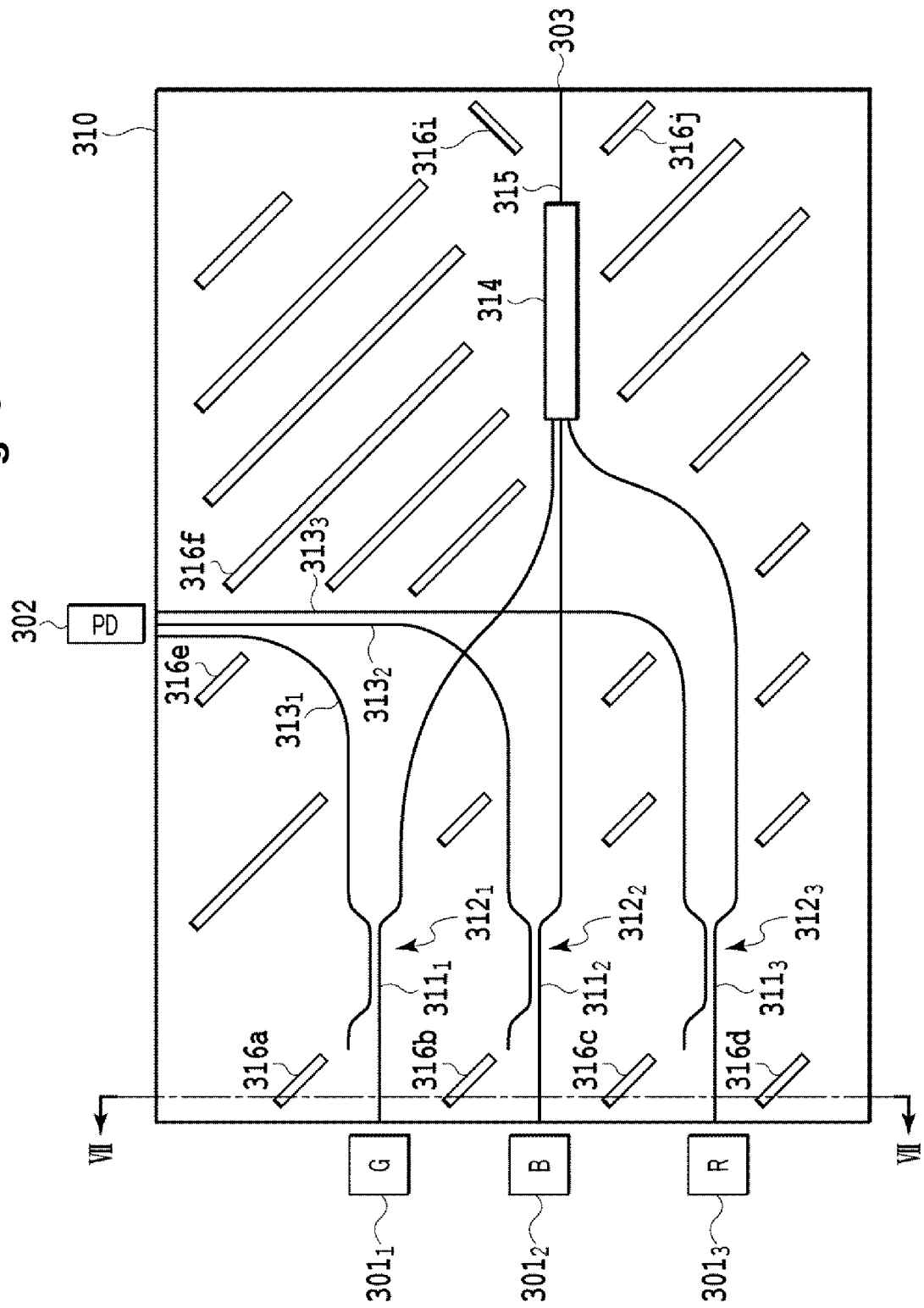
FIG. 8 illustrates a light source having a monitoring function according to a second practical example of the third embodiment of the present invention.

FIG. 8 illustrates a light source having a monitoring function according to a second practical example of the third embodiment. While in the first practical example first to third monitoring waveguides $323_1$ to $323_3$ are respectively connected to the PD $302_1$ to $302_3$, a single PD 302 receives an optical beam in the third practical example. When the PD has a large active light-receiving area on the light-receiving surface, the PD 302 can receive optical beams output from all the three monitoring waveguides $323_1$ to $323_3$ by arranging the three monitoring waveguides spaced apart by 5 to 20 μm from each other at an end surface of the RGB coupler 310.

To monitor optical beams of the colors R, G, and B, the first to third LDs $301_1$ to $301_3$ are controlled to emit optical beams in a time-division manner, and the optical beams are monitored by using the PD 302.

Similarly to the first practical example, the light-blocking grooves 316a to 316d are provided close to the connection surfaces between the LDs 301 and the input waveguides 311 on both sides with respect to each input waveguide 311; the light-blocking grooves 316e and 316f are provided close to the connection surface between the PD 302 and the monitoring waveguides 313 on both sides with respect to the monitoring waveguides 313; and the light-blocking grooves 316i and 316j are provided close to the exit end surface of the output waveguide 315 on both sides with respect to the output waveguide 315. The second practical example differs from the first practical example in that the monitoring waveguides are arranged together in one area, which results in enlarged spaces for light-blocking grooves. The effect of removing stray light is larger in the structure with many short light-blocking grooves than in the structure with long light-blocking grooves.

THIRD PRACTICAL EXAMPLE

Figure 9:
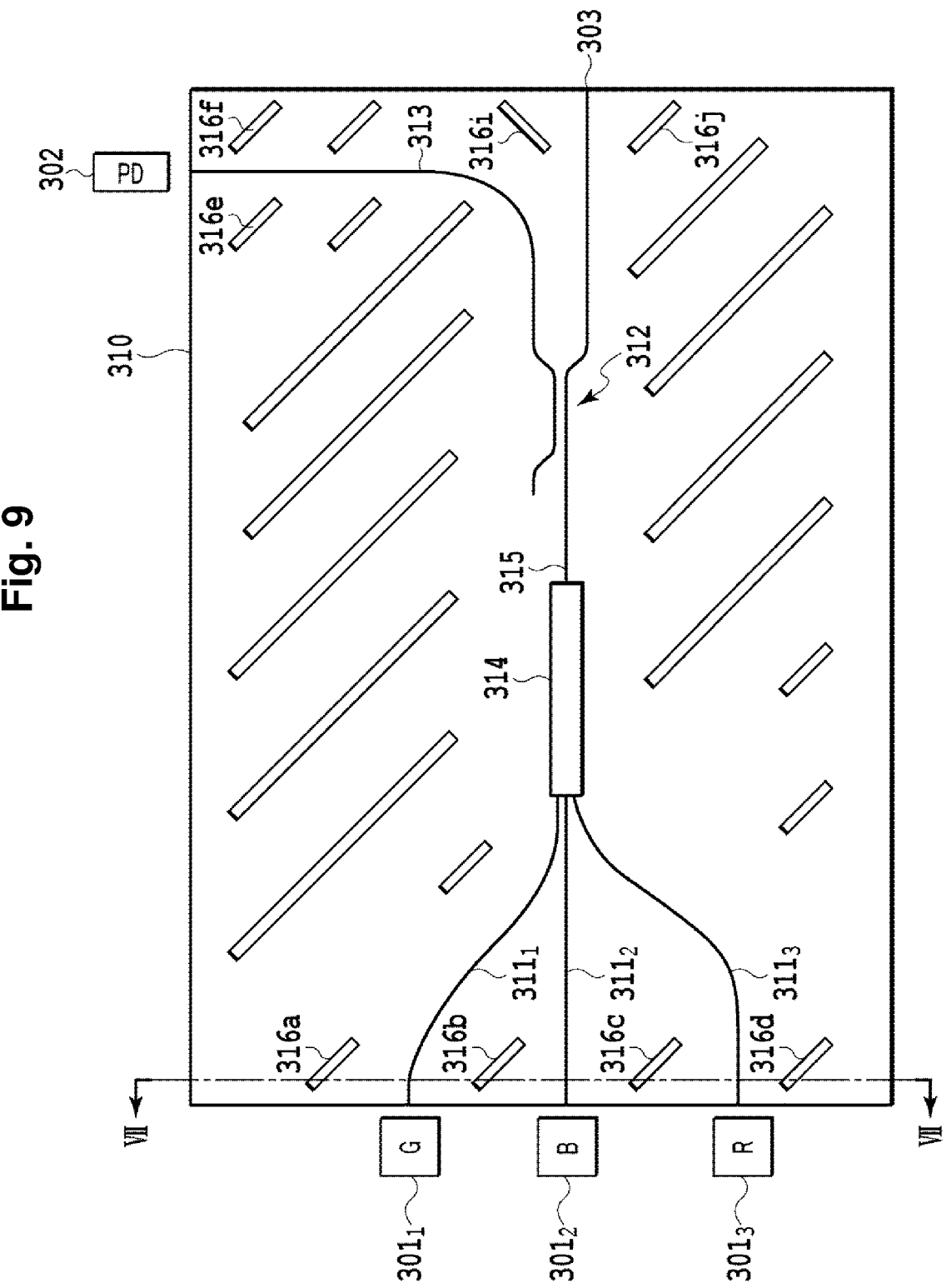
FIG. 9 illustrates a light source having a monitoring function according to a third practical example of the third embodiment of the present invention.

FIG. 9 illustrates a light source having a monitoring function according to a third practical example of the third embodiment. In the third practical example, the branch portion 312 is provided close to the output terminal of the combiner unit 314, and as a result, a part of the output of the combiner unit 314 is input to the PD 302 through the monitoring waveguide 313. In the third practical example, the output of the output waveguide 315 is directly monitored, and thus, monitoring can be performed without circuits for monitoring the respective colors. This configuration enables the implementation of a smaller light source, and additionally, by previously determining the multiplexing characteristic of the combiner unit 314, it is possible to adjust white balance of the light source in accordance with monitor values obtained by using the PD 202.

Similarly to the first practical example, the light-blocking grooves 316a to 316d are provided close to the connection surfaces between the LDs 301 and the input waveguides 311 on both sides with respect to each input waveguide 311; the light-blocking grooves 316e and 316f are provided close to the connection surface between the PD 302 and the monitoring waveguide 313 on both sides with respect to the monitoring waveguide 313; and the light-blocking grooves 316i and 316j are provided close to the exit end surface of the output waveguide 315 on both sides with respect to the output waveguide 315. The monitoring waveguide is positioned close to the exit end surface, and as a result, since spaces for light-blocking grooves are further enlarged, long light-blocking grooves can be provided, which strengthens the effect of removing stray light.

OTHER PRACTICAL EXAMPLES

In the second embodiment illustrated in FIG. 4, light-blocking grooves may be provided in the RGB coupler 210. Light-blocking grooves are provided close to the connection surfaces between the LDs 201 and the input waveguides 211 on sides with respect to each input waveguide 211; light-blocking grooves are also provided on sides with respect to the output waveguide 215 to form a truncated V-shape in which the output waveguide 315 is interposed; and light-blocking grooves are also provided close to the connection surfaces between the PDs 202 and the monitoring waveguides 213 on sides with respect to each monitoring waveguide 213 to form a truncated V-shape in which the monitoring waveguide 213 is interposed. Additionally, a plurality of light-blocking grooves may be provided between the input waveguides 211, between the monitoring waveguides 213, and around the combiner unit 214.

REFERENCE SIGNS LIST 1-3, 21-23, 201, 301 LD
4-6 Lens
7-9 Half mirror
10-12 Dichroic mirror
13-15, 202, 302 Photodiode (PD)
16 MEMS
17 Screen
30, 100, 210, 310 RGB coupler
31-33 Waveguide
34, 35 Combiner
101-103, 211, 311 Input waveguide
104, 105 Directional coupler
106, 215, 315 Output waveguide
212, 312 Branch portion
213, 313 Monitoring waveguide
214, 314 Combiner unit
316, 404 Light-blocking groove
401 Substrate
402 Cladding
403 Core

The invention claimed is:

1. An optical beam combiner circuit comprising:
a plurality of branch portions configured to divide optical beams output from a plurality of input waveguides;
a combiner unit configured to combine optical beams, each of the optical beams being one of the divided optical beams obtained by one of the plurality of branch portions;
an output waveguide configured to output an optical beam obtained by the combiner unit combining the optical beams;
a plurality of monitoring waveguides configured to output optical beams, each of the optical beams being another of the divided optical beams obtained by one of the plurality of branch portions;
a plurality of light-blocking grooves provided on both sides with respect to each input waveguide, each of the plurality of light-blocking grooves being spaced apart by a predetermined interval from a corresponding one of the plurality of input waveguides, the plurality of light-blocking grooves being positioned to enable stray light not coupled to the plurality of input waveguides to be reflected toward an end surface different from an exit end surface of each monitoring waveguide and also different from an exit end surface of the output waveguide; and
a plurality of further light-blocking grooves provided around the combiner unit in parallel to the plurality of light-blocking grooves, the plurality of further light-blocking grooves having a different length than the plurality of light-blocking grooves,
wherein, because the further light-blocking grooves are in parallel to the plurality of light-blocking grooves, the further light-blocking grooves do not contact the plurality of light-blocking grooves.

2. The optical beam combiner circuit according to claim 1, wherein the plurality of light-blocking grooves are each tilted by an angle of 45 degrees to an optical axis from an entrance end surface of a corresponding one of the plurality of input waveguides.

3. The optical beam combiner circuit according to claim 1, wherein
the exit end surface of each of the monitoring waveguides extends in a direction perpendicular to the entrance end surface of each of the input waveguides and the exit end surface of the output waveguide, and
the plurality of light-blocking grooves are each positioned to reflect the stray light toward a surface opposite to the exit end surface of a corresponding one of the plurality of monitoring waveguides.

4. The optical beam combiner circuit according to claim 1, further comprising:
a plurality of light-blocking grooves provided on both sides with respect to each monitoring waveguide, each of the plurality of light-blocking grooves being spaced apart by a predetermined interval from a corresponding one of the plurality of monitoring waveguide, the plurality of light-blocking grooves being positioned to reflect the stray light in a direction different from an output direction in which an optical beam is output from the exit end surface of a corresponding one of the plurality of monitoring waveguides.

5. The optical beam combiner circuit according to claim 4, wherein the plurality of light-blocking grooves are each tilted by an angle of 45 degrees to the output direction of the plurality of monitoring waveguides.

6. The optical beam combiner circuit according to claim 1, further comprising:
a plurality of light-blocking grooves provided on both sides with respect to the output waveguide, each of the plurality of light-blocking grooves being spaced apart by a predetermined interval from the output waveguide, each of the plurality of light-blocking grooves being positioned to reflect the stray light in a direction different from an output direction in which an optical beam is output from the output waveguide.

7. The optical beam combiner circuit according to claim 6, wherein the plurality of light-blocking grooves include a first light-blocking groove tilted by an angle of 45 degrees to an optical axis of the output waveguide and a second light-blocking groove provided on a side different from the first light-blocking groove with respect to the output waveguide and tilted by an angle of 90 degrees to the first light-blocking groove.

8. The optical beam combiner circuit according to claim 2, wherein
   the exit end surface of each of the monitoring waveguides extends in a direction perpendicular to the entrance end surface of each of the input waveguides and the exit end surface of the output waveguide, and
   the plurality of light-blocking grooves are each positioned to reflect the stray light toward a surface opposite to the exit end surface of a corresponding one of the plurality of monitoring waveguides.

9. The optical beam combiner circuit according to claim 2, further comprising:
   a plurality of light-blocking grooves provided on both sides with respect to each monitoring waveguide, each of the plurality of light-blocking grooves being spaced apart by a predetermined interval from a corresponding one of the plurality of monitoring waveguide, the plurality of light-blocking grooves being positioned to reflect the stray light in a direction different from an output direction in which an optical beam is output from the exit end surface of a corresponding one of the plurality of monitoring waveguides.

10. The optical beam combiner circuit according to claim 2, further comprising:
    a plurality of light-blocking grooves provided on both sides with respect to the output waveguide, each of the plurality of light-blocking grooves being spaced apart by a predetermined interval from the output waveguide, each of the plurality of light-blocking grooves being positioned to reflect the stray light in a direction different from an output direction in which an optical beam is output from the output waveguide.

* * * * *